US012587741B2

(12) United States Patent
Nishikawa

(10) Patent No.: US 12,587,741 B2
(45) Date of Patent: Mar. 24, 2026

(54) IMAGE PICKUP APPARATUS AND CONTROL METHOD THEREFOR

(71) Applicant: CANON KABUSHIKI KAISHA, Tokyo (JP)

(72) Inventor: Shun Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 18/542,092

(22) Filed: Dec. 15, 2023

(65) Prior Publication Data

US 2024/0205541 A1 Jun. 20, 2024

(30) Foreign Application Priority Data

Dec. 20, 2022 (JP) ................................. 2022-203597

(51) Int. Cl.
| | |
|---|---|
| *H04N 23/67* | (2023.01) |
| *H04N 23/61* | (2023.01) |
| *H04N 23/62* | (2023.01) |
| *H04N 23/667* | (2023.01) |
| *H04N 23/73* | (2023.01) |

(52) U.S. Cl.
CPC ............ *H04N 23/67* (2023.01); *H04N 23/61* (2023.01); *H04N 23/62* (2023.01); *H04N 23/667* (2023.01); *H04N 23/73* (2023.01)

(58) Field of Classification Search
CPC .... H04N 23/672; H04N 23/611; H04N 23/73; H04N 23/667; H04N 23/62; H04N 23/61; H04N 23/67; H04N 5/23219; G06K 9/00624; G06K 9/46; G02B 7/28; G03B 13/36
USPC ........................................................ 348/345
See application file for complete search history.

(56) References Cited

U.S. PATENT DOCUMENTS

| | | | | |
|---|---|---|---|---|
| 2017/0195546 A1* | 7/2017 | Tamura | .................. | H04N 23/56 |
| 2018/0063413 A1* | 3/2018 | Yoshino | ................. | H04N 23/75 |
| 2018/0063415 A1* | 3/2018 | Hongu | ................. | H04N 23/611 |
| 2019/0335111 A1* | 10/2019 | Noda | ................... | H04N 23/667 |
| 2020/0195857 A1* | 6/2020 | Sekine | ................. | H04N 25/583 |

FOREIGN PATENT DOCUMENTS

| | | |
|---|---|---|
| JP | 2000066086 A | 3/2000 |
| JP | 2014074854 A | 4/2014 |

* cited by examiner

*Primary Examiner* — Xi Wang
(74) *Attorney, Agent, or Firm* — Canon U.S.A., Inc. IP Division

(57) ABSTRACT

An image pickup apparatus includes a detection unit configured to detect a specific object from an image picked up by an image pickup unit, a determination unit configured to determine whether a subject is a moving object, and a setting unit configured to set a sensitivity to be used when the determination unit determines that the subject is a moving object. The setting unit sets the sensitivity depending on whether the specific object is detected by the detection unit.

22 Claims, 8 Drawing Sheets

FIG.6

| SENSITIVITY LEVEL | S0 | S1 | S2 | S3 | S4 | S5 |
|---|---|---|---|---|---|---|
| MOTION DETERMINATION DEFOCUS DIFFERENCE | D0 | D1 | D2 | D3 | D4 | D5 |
| NUMBER OF MOTION DETERMINATIONS | N0 | N1 | N2 | N3 | N4 | N5 |

FIG.7

| RECOGNIZED SUBJECT TYPE | | NOT RECOGNIZED | FLOWER | PERSON | DOG/CAT | BIRD | VEHICLE |
|---|---|---|---|---|---|---|---|
| DURING SW1 PRESS | | S0 | S1 | S2 | S3 | S4 | S5 |
| DURING SW2 PRESS | SINGLE IMAGE-CAPTURING SETTING | S0 | S2 | S3 | S4 | S5 | S5 |
| | CONTINUOUS IMAGE-CAPTURING SETTING | S0 | S3 | S4 | S5 | S5 | S5 |

FIG.8

| MOVING OBJECT DETERMINATION LIMIT DISTANCE | L0 | L1 | L2 | L3 | L4 | L5 |
|---|---|---|---|---|---|---|
| RECOGNIZED SUBJECT TYPE | NOT RECOGNIZED | FLOWER | PERSON | DOG/CAT | BIRD | VEHICLE |

IMAGE PICKUP APPARATUS AND CONTROL METHOD THEREFOR

BACKGROUND

Field of the Disclosure

The present disclosure relates to an image pickup apparatus having a moving object determination function, and a control method for the image pickup apparatus.

Description of the Related Art

Conventionally, there has been an image pickup apparatus that performs an autofocus (AF) operation to keep focusing on a moving subject, in sports photography, railroad photography, and the like. Japanese Patent Application Laid-Open No. 2014-74854 discusses the following scheme. When continuous image-capturing begins, a first AF operation to fix focus once the focus is achieved is switched to a second AF operation to keep focusing on a moving subject. Focus tracking according to the motion of a subject can be thereby performed during the continuous image-capturing. Japanese Patent Application Laid-Open No. 2000-66086 discusses the following scheme. In a case where a subject is in back focus after a first AF operation to fix focus once the focus is achieved, it is determined that the subject is a moving object and fixing of the focus is released, and focus tracking can be immediately performed on the back focus subject.

In Japanese Patent Application Laid-Open No. 2014-74854, however, in a case where the subject has a low contrast or has a small size in terms of an angle of view, an in-focus position can be unstable because of variation in focus detection result, even if the subject is not moving. In Japanese Patent Application Laid-Open No. 2000-66086, if the subject is erroneously determined as a moving object, an in-focus position can be made unstable by switching to an AF operation to keep focusing on the subject.

SUMMARY

Aspects of the present disclosure generally provide for enabling adaptive determination as to whether a subject is a moving object, and to enabling appropriate switching between a first AF operation to fix focus once the focus is achieved and a second AF operation to keep focusing on a moving subject, by adaptively determining whether a subject is a moving object.

According to an aspect of the present disclosure, an image pickup apparatus includes a detection unit configured to detect a specific object from an image picked up by an image pickup unit, a determination unit configured to determine whether a subject is a moving object, and a setting unit configured to set a sensitivity to be used when the determination unit determines that the subject is a moving object, wherein the setting unit sets the sensitivity depending on whether the specific object is detected by the detection unit.

Further features of the present disclosure will become apparent from the following description of embodiments with reference to the attached drawings.

BRIEF DESCRIPTION OF THE DRAWINGS

FIG. 6 is a diagram illustrating an example of a correspondence between a parameter and a sensitivity to be used for moving object determination in the embodiment.

FIG. 7 is a diagram illustrating an example of a correspondence between a sensitivity and a subject recognition result to be used for moving object determination in the embodiment.

FIG. 8 is a diagram illustrating an example of a correspondence between a distance for limiting moving object determination and a subject recognition result in the embodiment.

DESCRIPTION OF THE EMBODIMENTS

Exemplary embodiments of the present disclosure will be described in detail with reference to the attached drawings.

A first embodiment will be described.

<Configuration of Image Pickup Apparatus>

Figure 1:
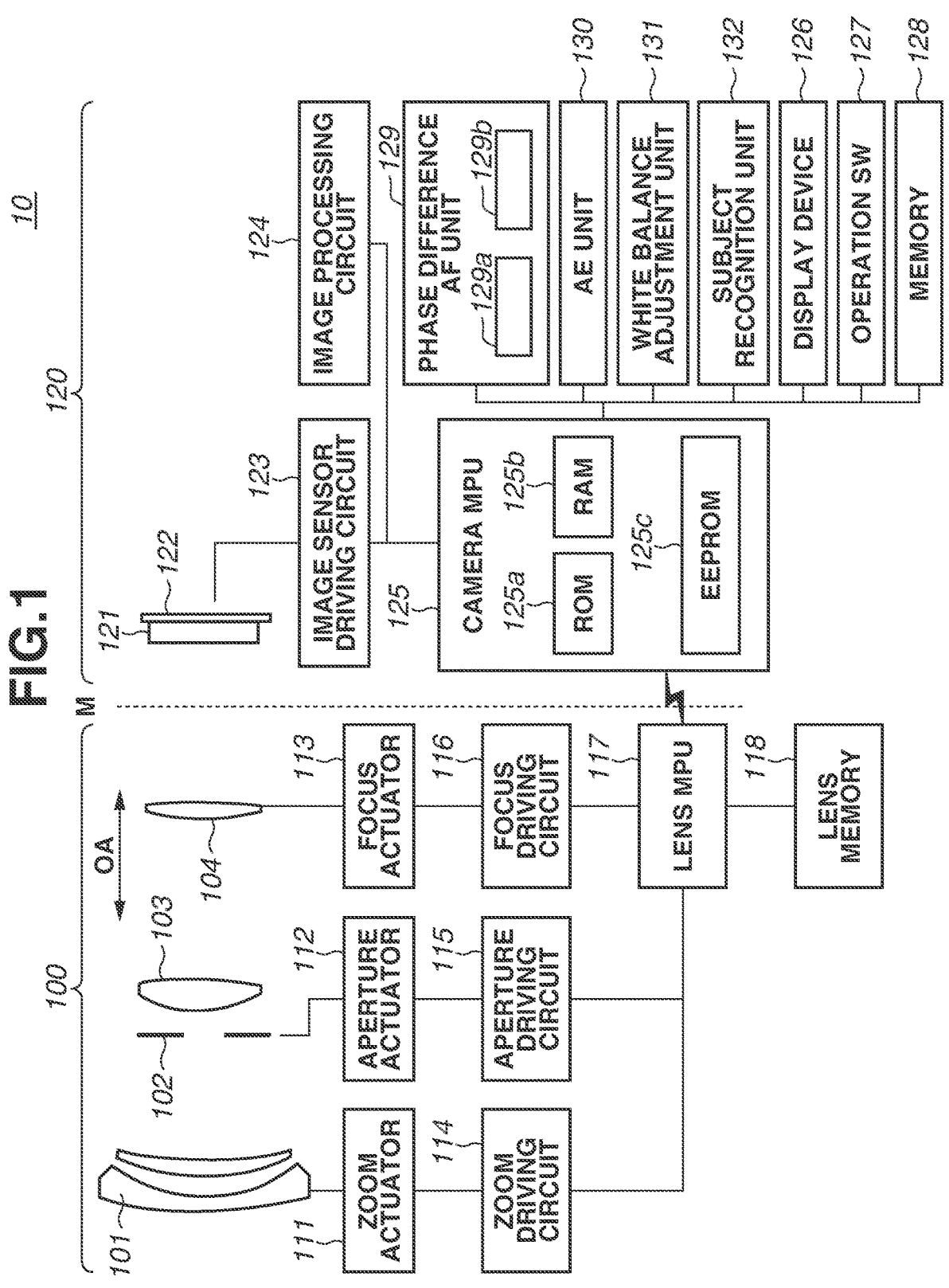
FIG. 1 is a block diagram illustrating a configuration of an image pickup apparatus in an embodiment of the present disclosure.

FIG. 1 is a block diagram illustrating an image pickup apparatus 10 (a digital camera of interchangeable lens type) in the present embodiment. The image pickup apparatus 10 is a camera system including a lens unit 100 (an interchangeable lens) and a camera main body 120. The lens unit 100 is detachably attached to the camera main body 120 via a mount M indicated by a dotted line in FIG. 1. However, the present embodiment is not limited to the example, and the lens unit and the camera main body may be integrated with each other. The present embodiment is not limited to the digital camera, and is applicable to other image pickup apparatuses such as a video camera, a smartphone, a tablet terminal, a pan-tilt camera, a wearable camera, and an on-vehicle camera.

The lens unit 100 includes a first lens group 101 as an optical system, an aperture stop 102, a second lens group 103, a focus lens group (hereinafter simply referred to as "focus lens") 104, and a drive/control system.

The first lens group 101 is located at the front end of the lens unit 100, and is held to be movable forward and backward in an optical axis direction OA. The aperture stop 102 adjusts the light amount at the time of capturing an image by adjusting the aperture diameter of the aperture stop 102, and functions as an exposure time adjustment shutter in still image capturing. The aperture stop 102 and the second lens group 103 can integrally move in the optical axis direction OA, and implement a zoom function by interlocking with the forward and backward movements of the first lens group 101. The focus lens 104 can move in the optical axis direction OA, and a subject distance (a focal distance) at which the lens unit 100 is focused changes depending on the position of the focus lens 104. It is possible to perform focus adjustment (focus control) of adjusting the focal distance of the lens unit 100, by controlling the position of the focus lens 104 in the optical axis direction OA.

The drive/control system includes a zoom actuator 111, an aperture actuator 112, a focus actuator 113, a zoom driving circuit 114, an aperture driving circuit 115, a focus driving circuit 116, a lens micro processing unit (MPU) 117, and a lens memory 118. The zoom driving circuit 114 drives the first lens group 101 and the second lens group 103 in the optical axis direction OA, using the zoom actuator 111, thereby controlling the angle of view of the optical system of the lens unit 100 (performs a zooming operation). The aperture driving circuit 115 drives the aperture stop 102, using the aperture actuator 112, thereby controlling the aperture diameter and opening/closing operation of the aperture stop 102. The focus driving circuit 116 drives the focus lens 104 in the optical axis direction OA, using the focus actuator 113, thereby controlling the focal distance of the optical system of the lens unit 100 (performs focus control). The focus driving circuit 116 has a function as a position detection unit that detects the current position (lens position) of the focus lens 104, using the focus actuator 113.

The lens MPU 117 (processor) performs all calculations and controls related to the lens unit 100, and controls the zoom driving circuit 114, the aperture driving circuit 115, and the focus driving circuit 116. The lens MPU 117 is connected to a camera MPU 125 via the mount M, and communicates commands and data. For example, the lens MPU 117 detects the position of the focus lens 104, and notifies lens position information in response to a request from the camera MPU 125. This lens position information includes information such as the position of the focus lens 104 in the optical axis direction OA, the position and diameter of an exit pupil in the optical axis direction OA in a state where the optical system is not moving, and the position and diameter of a lens frame, which limits the light beam of the exit pupil, in the optical axis direction OA. The lens MPU 117 controls the zoom driving circuit 114, the aperture driving circuit 115, and the focus driving circuit 116, in response to a request from the camera MPU 125. The lens memory 118 stores optical information desirable for automatic focusing (autofocus (AF) control). The camera MPU 125 controls the operation of the lens unit 100 by executing a program stored in, for example, a built-in nonvolatile memory or the lens memory 118.

The camera main body 120 includes an optical low-pass filter 121, an image sensor 122, and a drive/control system. In the present embodiment, the first lens group 101, the aperture stop 102, the second lens group 103, the focus lens 104, and the optical low-pass filter 121 are included in an image pickup optical system. The image sensor 122 functions as an image pickup unit that photoelectrically converts a subject image formed via the image pickup optical system, and outputs each of an image signal and a signal for focus detection as image data.

The optical low-pass filter 121 reduces false color and moire of a captured image. The image sensor 122 is composed of a complementary metal-oxide semiconductor (CMOS) image sensor and a peripheral circuit thereof, and m pixels in the horizontal direction and n pixels in the vertical direction (each of m and n is an integer of 2 or more) are arranged in the image sensor 122. The image sensor 122 of the present embodiment also serves as a focus detection element, has a pupil-dividing function, and includes a pupil division pixel capable of performing focus detection (phase difference AF) employing a phase difference detection method using the image data (signal for focus detection). The drive/control system includes an image sensor driving circuit 123, an image processing circuit 124, the camera MPU 125, a display device 126, an operation switch group (operation switch (SW)) 127, and a memory 128. The drive/control system further includes a phase difference AF unit 129 (image pickup plane phase difference focus detection unit, control unit), an autoexposure (AE) unit 130 (control unit), a white balance adjustment unit 131 (control unit), and a subject recognition unit 132 (detection unit). The image sensor driving circuit 123 controls the operation of the image sensor 122, performs analog to digital (A/D) conversion of the image data (image signal) output from the image sensor 122, and transmits the result to the camera MPU 125. The image processing circuit 124 performs general image processing performed in a digital camera, such as $\gamma$ conversion, color interpolation processing, and compression encoding processing, for the image signal output from the image sensor 122.

The image processing circuit 124 generates a signal for phase difference AF, a signal for AE, a signal for white balance adjustment, and a signal for subject recognition. In the present embodiment, the signal for phase difference AF, the signal for AE, the signal for white balance adjustment, and the signal for subject recognition are independently generated. However, for example, the signal for AE, the signal for white balance adjustment, and the signal for subject recognition may be generated as a common signal. The combination of signals to be the common signal is not limited to the above example.

The camera MPU 125 (processor, controller) performs all calculations and controls related to the camera main body 120. In other words, the camera MPU 125 controls the image sensor driving circuit 123, the image processing circuit 124, the display device 126, the operation switch group 127, the memory 128, the phase difference AF unit 129, the AE unit 130, the white balance adjustment unit 131, and the subject recognition unit 132. The camera MPU 125 is connected to the lens MPU 117 via a signal line of the mount M, and communicates commands and data to the lens MPU 117. The camera MPU 125 issues requests such as a request for acquisition of a lens position, a request for lens driving based on a predetermined drive amount, and a request for acquisition of optical information unique to the lens unit 100 from the lens MPU 117, to the lens MPU 117.

A read only memory (ROM) 125a that stores a program for controlling the operation of the camera main body 120, a random access memory (RAM) 125b (camera memory) that stores variables, and an electrically erasable programmable ROM (EEPROM) 125c that stores various parameters are built in the camera MPU 125. The camera MPU 125 executes focus detection processing employing a phase difference detection method to be described below, based on the program stored in the ROM 125a.

The display device 126 includes a liquid crystal display (LCD), and displays information about an image capturing mode of the image pickup apparatus 10, a preview image before image capturing, an image for confirmation after image capturing, and an in-focus state display image in the focus detection. The operation switch group 127 includes a power switch, a shutter button (image capturing trigger), a zoom operation switch, and an image capturing mode selection switch. The memory 128 (recording unit) is a detachable flash memory, and records captured images.

The phase difference AF unit 129 performs the focus detection processing employing the phase difference detection method, based on a signal for focus detection (signal for phase difference AF) obtained from the image sensor 122 and the image processing circuit 124. To be more specific, the image processing circuit 124 generates the signal for phase difference AF (a pair of image signals) from the signal for focus detection formed by a light beam passing through different pupil regions of the image pickup optical system, and the phase difference AF unit 129 detects a defocus amount, based on a shift amount of the pair of image signals. In this way, the phase difference AF unit 129 of the present embodiment performs the phase difference AF (image pickup plane phase difference AF) based on the output of the image sensor 122, without using a dedicated AF sensor. In the present embodiment, the phase difference AF unit 129 includes an acquisition unit 129a and a calculation unit 129b. The operation of each of these units will be described below. At least a part (a part of the acquisition unit 129a or the calculation unit 129b) of the phase difference AF unit 129 may be disposed in the camera MPU 125. The details of the operation of the phase difference AF unit 129 will be described below. The phase difference AF unit 129 functions as a focus control unit that controls the position of the focus lens 104, using the focus detection result.

The AE unit 130 performs exposure adjustment processing for making image capturing conditions appropriate, by performing photometry, based on the signal for AE obtained from the image sensor 122 and the image processing circuit 124. Specifically, the exposure adjustment processing is performed as follows. The photometry is performed based on the signal for AE, and an exposure amount is calculated based on the currently set aperture value, shutter speed, and ISO sensitivity. Based on the difference between the calculated exposure amount and a predetermined appropriate exposure amount, an aperture value, a shutter speed, and an ISO sensitivity which are appropriate values to be set at the time of image capturing are calculated, and then set as the image capturing conditions. The AE unit 130 functions as an exposure adjustment unit that calculates exposure conditions to be used at the time of image capturing, using a photometry result, and controls the aperture value, shutter speed, and ISO sensitivity of the aperture stop 102.

The white balance adjustment unit 131 performs white balance adjustment processing, based on the signal for white balance adjustment obtained from the image sensor 122 and the image processing circuit 124. Specifically, the white balance adjustment processing is performed by calculating a white balance of the signal for white balance adjustment, and adjusting the weight of color, based on the difference from a predetermined appropriate white balance.

The subject recognition unit 132 performs subject recognition processing, based on the signal for subject recognition generated by the image processing circuit 124. The type and state (detection type) of a subject, and the position and size (detection area) of the subject are detected by the subject recognition processing. The details of the operation of the subject recognition unit 132 will be described below.

The image pickup apparatus 10 of the present embodiment can execute the phase difference AF, the photometry (exposure adjustment), the white balance adjustment, and the subject recognition in combination. A position (image height range) for performing the phase difference AF, the photometry, and the white balance adjustment can be selected based on the result of the subject recognition.

<Example of Configuration of Image Sensor>

An example of a configuration of the image sensor 122 in the present embodiment and signals to be read out will be described.

Figure 2:
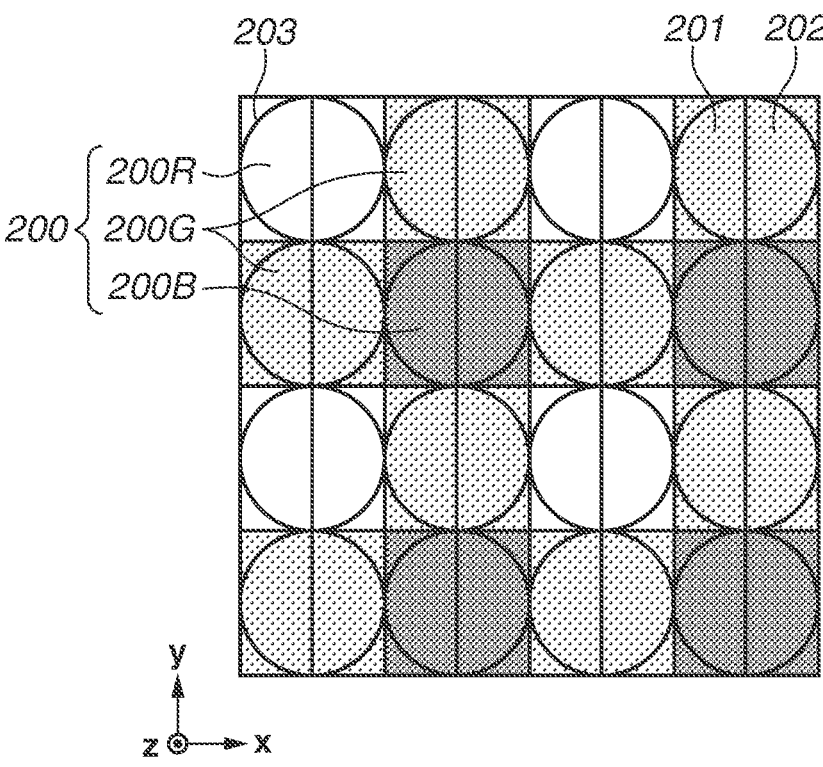
FIG. 2 is a schematic diagram illustrating a pixel array of an image sensor in the embodiment.

FIG. 2 is a schematic diagram illustrating a pixel array of the image sensor 122 in the present embodiment, and illustrates a pixel array of a two-dimensional CMOS sensor used as the image sensor 122 in the range of 4 rows×4 columns of image pixels (the range of 4 rows×8 columns as an array of focus detection pixels).

In the present embodiment, a pixel group 200 consists of pixels in 2 rows×2 columns, and is covered by a color filter of Bayer array. In each of the pixel groups 200, a pixel 200R having a spectral sensitivity of R (red) is disposed at the upper left position, a pixel 200G having a spectral sensitivity of G (green) is disposed at each of the upper right position and the lower left position, and a pixel 200B having a spectral sensitivity of B (blue) is disposed at the lower right position. Further, in the image sensor 122 of the present embodiment, each of the pixels holds a plurality of photodiodes (photoelectric conversion units) with respect to one micro lens 203, in order to perform focus detection employing an image pickup plane phase difference method. In the present embodiment, each of the pixels is composed of two photodiodes 201 (first focus detection pixel) and 202 (second focus detection pixel) arranged in 1 row×2 columns.

The image signal and the signal for focus detection can be acquired by disposing multiple sets of the image pickup pixels in 4 rows×4 columns illustrated in FIG. 2 (the focus detection pixels in 4 rows×8 columns) on a surface. In the present embodiment, the description will be provided using an image sensor in which a period P of the pixels is 4 μm, a pixel number N is 3725 rows×5575 columns=about 20.75 million pixels, a column direction period PAF of the focus detection pixels is 2 m, and a focus detection pixel number NAF is 3725 rows×11150 columns=about 41.5 million pixels.

In each of the pixels having such a configuration, a light beam that has passed through different pupil regions of the image pickup optical system of the lens unit 100 is separated by the micro lens 203, and focused on the photodiodes 201 and 202. A signal (A+B signal) determined by adding signals from the two photodiodes 201 and 202 is used as an image signal for recording, and two signals (A signal and B signal) read out from the respective photodiodes 201 and 202 are each used as the signal for focus detection. Although the image signal and the signal for focus detection may each be read out, the following may be performed in consideration of processing load. In other words, the image signal (A+B signal) and the signal for focus detection of either one of the photodiodes 201 and 202 (e.g., A signal) are read out, and the difference between these signals is determined, so that the other signal for focus detection (e.g., B signal) having parallax is acquired. Using the thus obtained signals for focus detection, the focus detection (image pickup plane phase difference AF) by the image pickup plane phase difference method can be performed.

<Image Capturing Processing Flow>

Figure 3:
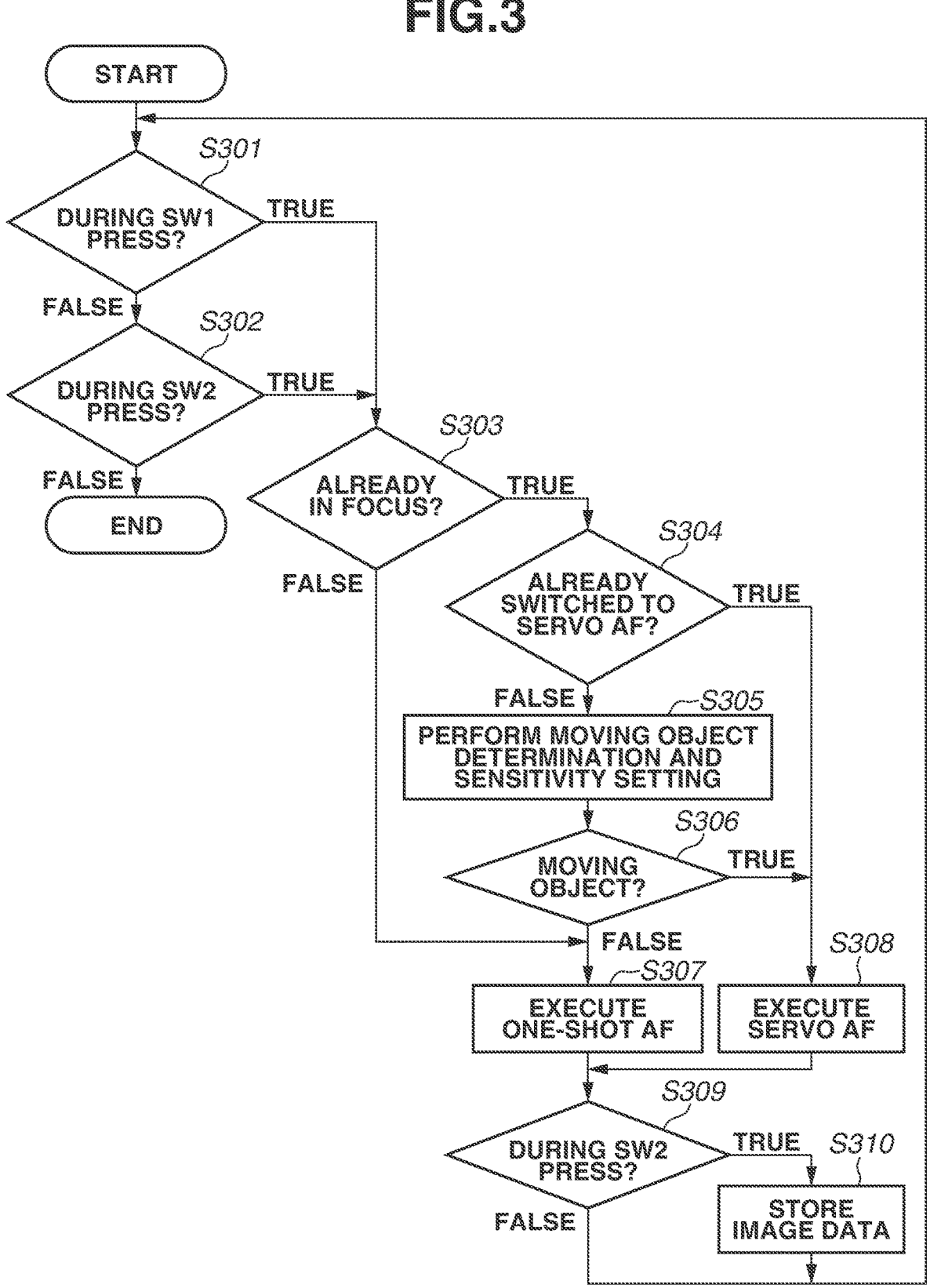
FIG. 3 is a flowchart illustrating an image capturing processing example in the embodiment.

An overall control method at the time of image capturing of the present embodiment will be described with reference to FIG. 3.

The shutter button included in the operation switch group 127 has a stage to be enabled when the shutter button is half-pressed (half press) and a stage to be enabled when the shutter button is fully pressed (full press). The stage to be enabled when the shutter button is half-pressed will be referred to as "SW1", and the stage to be enabled when the shutter button is fully pressed will be referred to as "SW2". In other words, the SW1 is enabled and the SW2 is disabled during the SW1 press, whereas the SW1 is disabled and the SW2 is enabled during the SW2 press.

In step S301, whether the current stage is the SW1 being pressed is determined. In step S302, whether the current stage is the SW2 being pressed is determined. If the current stage is the SW1 being pressed (YES in step S301) or the SW2 being pressed (YES in step S302), the processing proceeds to control in step S303.

In step S303, whether a subject has ever been in focus during the SW1 being pressed or the SW2 being pressed is determined. If the subject has never been in focus (NO in step S303), the processing proceeds to step S307. If the subject has been in focus (YES in step S303), the processing proceeds to step S304. The reason why the processing proceeds to step S307 if the subject has never been in focus is that there is a possibility that sufficient accuracy of determination cannot be obtained if moving object determination is performed in a blurring state.

In step S304, whether servo AF (may also be referred to as "continuous AF") has already been executed by enabling the moving object determination during the SW1 or SW2 being pressed is determined. If the servo AF has already been executed (YES in step S304), the processing proceeds to step S308 to execute the servo AF irrespective of the result of the moving object determination. On the other hand, if the servo AF has not been executed (NO in step S304), the processing proceeds to step S305. This is because the subject is highly likely to be an object that has moved before, if the servo AF has been performed once on the subject. The servo AF here is an AF mode suitable for a moving subject, and is an AF processing mode for keeping focusing to track the subject.

In step S305, the level of the sensitivity of the moving object determination to be executed in step S306 using information such as the subject recognition result from the subject recognition unit 132 is determined, and this sensitivity is set. The details of the processing of this sensitivity setting for the moving object determination will be described below.

In step S306, whether the subject is a moving object is determined according to the sensitivity set in step S305, from the defocus amount of the subject obtained from the phase difference AF unit 129. If the subject is not a moving object (NO in step S306), the processing proceeds to step S307. If the subject is a moving object (YES in step S306), the processing proceeds to step S308. The details of the processing of this moving object determination will be described below.

In step S307, the focus lens 104 is moved based on the defocus amount of the subject, and one-shot AF (may also be referred to as "single AF") is executed. The one-shot AF here is a mode suitable for a subject with no motion, and is an AF processing mode for fixing focus once the focus is achieved, by prohibiting driving of the focus lens until the SW1 or SW2 is disabled.

In step S308, the servo AF to keep focusing on the subject is executed by keeping the focus lens driven based on the defocus amount of the subject until the SW1 or SW2 is disabled.

In step S309, whether the current stage is the SW2 being pressed is determined. If the current stage is the SW2 being pressed (YES in step S309), the processing proceeds to step S310. If the current stage is not the SW2 being pressed (NO in step S309), the processing returns to step S301.

In step S310, the image data for recording generated by the image processing circuit 124 is stored into the memory 128.

After step S309 and step S310, the processing returns to step S301, and the processing is similarly repeated in a case where the current stage is the SW1 being pressed or the SW2 being pressed, and the processing ends if the shutter button is not pressed.

<Flow of Processing of Moving Object Determination>

Figure 4:
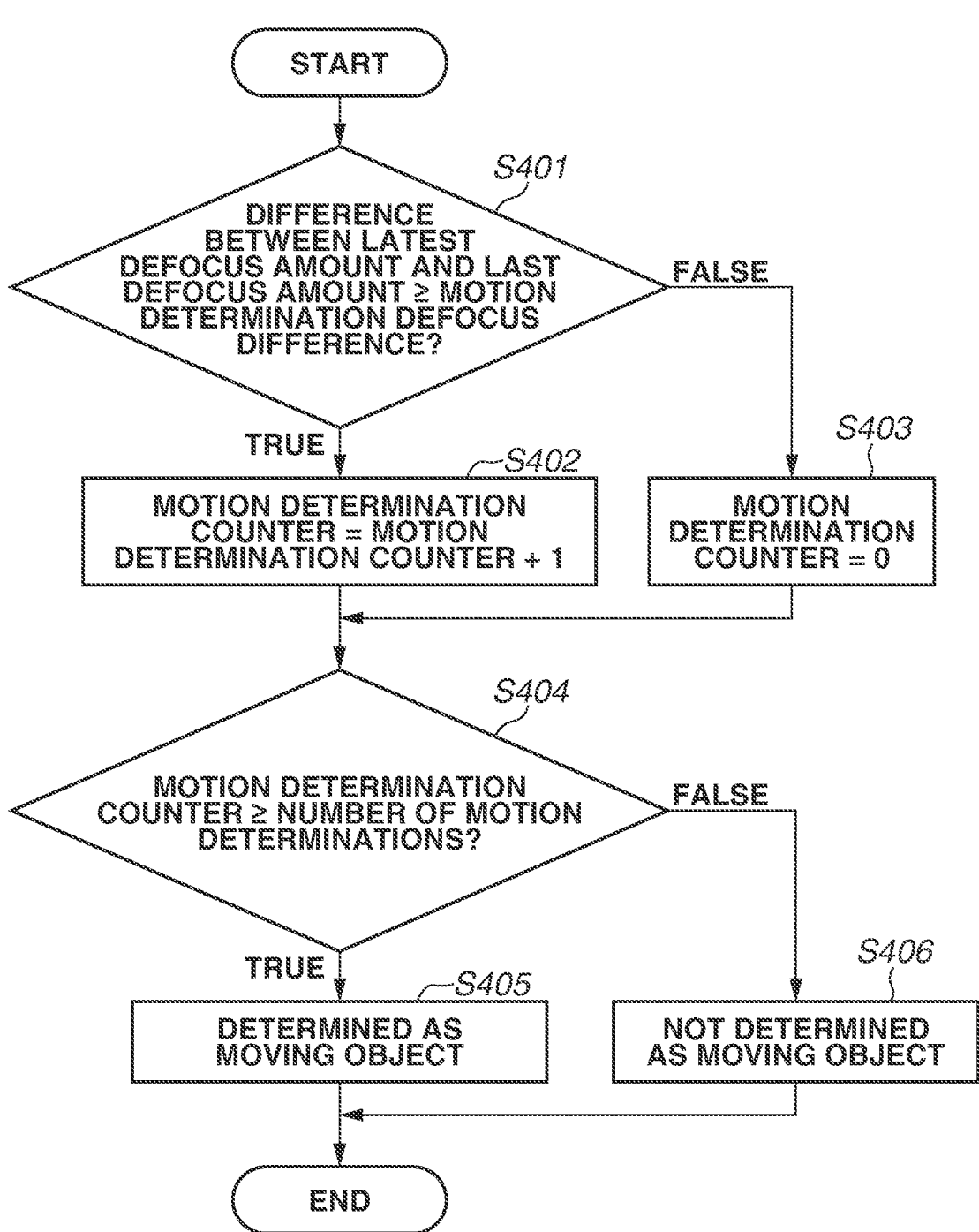
FIG. 4 is a flowchart illustrating processing for moving object determination in the embodiment.

The details of the moving object determination in step S306 will be described with reference to FIG. 4 and FIG. 5. FIG. 4 illustrates a flow of processing of the moving object determination. In step S401, if the difference between a defocus amount that is the latest focus detection result and a defocus amount detected in the last period among defocus amounts periodically detected for the subject is more than or equal to a motion determination defocus difference (YES in step S401), the processing proceeds to step S402. On the other hand, if the difference is less than the motion determination defocus difference (NO in step S401), the processing proceeds to step S403. The motion determination defocus difference is a threshold for determining that a subject has moved, based on the difference between defocus amounts periodically detected and adjacent to each other in time series.

Figure 5:
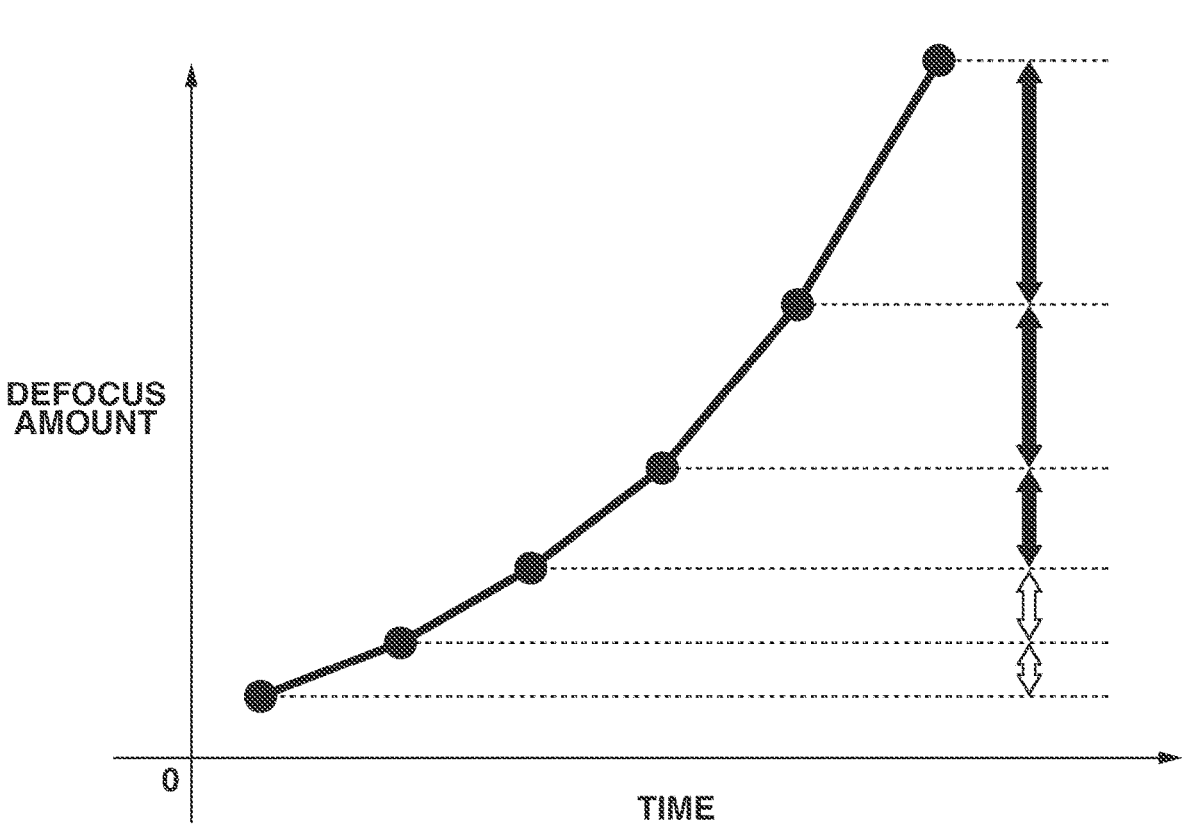
FIG. 5 is a diagram illustrating an example of a defocus amount to be used for moving object determination in the embodiment.

In FIG. 5, a vertical axis represents the defocus amount of the subject, a horizontal axis represents the time when the defocus amount is detected, an upward direction above 0 in the vertical axis represents a defocus amount of front focus, and a downward direction represents a defocus amount of back focus. Each black point is a defocus amount detected for the subject at each time, and the focus lens is not moving during pickup of an image for detecting this defocus amount.

Among the differences between the defocus amounts adjacent to each other in time series, a difference more than or equal to the motion determination defocus difference is represented by a black arrow, and a difference less than the motion determination defocus difference is represented by a white arrow.

In step S402, a motion determination counter representing the number of times it is determined in step S401 that the subject has moved is counted up.

In step S403, because it is not determined in step S401 that the subject has moved, the motion determination counter is initialized to 0.

In FIG. 5, the latest difference between the defocus amounts adjacent to each other in time series is more than or equal to the determination defocus difference three times in a row, and therefore, the motion determination counter is 3.

In step S404, whether the motion determination counter is more than or equal to the number of motion determinations is determined, and if the motion determination counter is more than or equal to the number of motion determinations (YES in step S404), the processing proceeds to step S405. If the motion determination counter is less than the number of motion determinations (NO in step S404), the processing proceeds to step S406. The number of motion determinations is a threshold for determining that the subject is a moving object to which the servo AF is to be applied, based on the number of times it is determined in a row based on step S401 that the subject has moved. In FIG. 5, the motion determination counter is 3, and therefore, the processing can proceed to step S405 by determining that the subject is a moving object in a case where the number of motion determinations is 3 or less.

In step S405, the result of the moving object determination is that the subject is a moving object, and in step S406, the result of the moving object determination is that the subject is a non-moving object. Afterward, the processing of the moving object determination ends.

The above-described moving object determination makes it possible to switch between the servo AF and the one-shot AF. Further, using the result of this moving object determination, an icon indicating that a moving object is present within an angle of view may be superimposed on a captured image and displayed. This makes it possible to notify a user that the moving object is kept in focus.

<Sensitivity Setting for Moving Object Determination>

The details of the sensitivity setting for moving object determination in step S305 will be described. In the sensitivity setting, the level of the sensitivity to be used in the moving object determination in step S306 is determined, and the determined sensitivity is set.

Parameters varying depending on the sensitivity in the moving object determination in step S306 are the motion determination defocus difference and the number of motion determinations. The higher the sensitivity is (sensitive), the smaller the motion determination defocus difference is, and the less the number of motion determinations is. On the contrary, the lower the sensitivity is (insensitive), the greater the motion determination defocus difference is, and the more the number of motion determinations is. For this sensitivity, two values may be provided for being sensitive and for being insensitive, or a plurality of levels may be provided between being sensitive and being insensitive. FIG. 6 illustrates a correspondence between the sensitivity and each of the motion determination defocus difference and the number of motion determinations. As to the sensitivity, S0 is the lowest sensitivity, the sensitivity increases in order of S1, S2, S3, and S4, and S5 is the highest sensitivity. As to the motion determination defocus difference, D0 is the greatest motion determination defocus difference, and the motion determination defocus difference decreases in order of D1, D2, D3, and D4, and D5 is the smallest motion determination defocus difference. As to the number of motion determinations, N0 is the largest number of motion determinations, the number of motion determinations decreases in order of N1, N2, N3, and N4, and N5 is the smallest number of motion determinations.

In the sensitivity setting, the sensitivity is set using the subject recognition result obtained from the subject recognition unit 132. FIG. 7 illustrates a correspondence between the combination of a recognized subject type, a SW1/SW2 press state, and a single image-capturing/continuous image-capturing setting, and the sensitivity. In the present embodiment, the subject recognition unit 132 can recognize specific objects including flowers, persons, animals such as dogs/cats/birds, and vehicles (cars). The sensitivity setting depending on the type of a recognized subject will be described using the sensitivity during the SW1 being pressed in FIG. 7. The sensitivity is set to be higher for a faster-moving higher-contrast subject, depending on the type of the recognized subject. In particular, in a case where a subject cannot be recognized, the sensitivity is set to the lowest S0 not to perform the moving object determination sensitively. In a case where a subject cannot be recognized, a subject at a position automatically selected by giving priority to being at the center of an angle of view, or detecting a defocus amount on the side closer than other focus detection positions is brought into focus. However, because the subject recognition result cannot be used, there is no guarantee that the automatically selected position keeps tracking the specific subject. Therefore, there is a possibility that the defocus amount of a subject different from a subject brought into focus once is used in the moving object determination because of camera shake or the like, and this different subject is erroneously determined as a moving object. For this reason, in a case where a subject cannot be recognized, a setting is made not to perform the moving object determination sensitively. In a case where the subject type is flower as a result of the subject recognition, the subject can be erroneously determined as a moving object, because of camera shake, swing of the subject caused by wind, or the like, even though the subject is not a moving object. Accordingly, the sensitivity S1, which makes it easier to determine a moving object than S0, but more insensitive than other subject types, is set. In a case where the subject type is person, the subject is a moving subject. However, there is a possibility that the subject is erroneously determined as a moving object even if the subject is still, because the contrast is low for the face or the like of a person and thus the focus detection result becomes unstable, so that a wrong defocus amount is used in the moving object determination. Accordingly, S2, which is more sensitive than that for flower and more insensitive than those for dog/cat and bird, is set. In a case where the subject type is dog/cat or bird, the contrast can be low as with person, but it is desirable to perform the moving object determination more sensitively for this type than for person, because the subject moves faster than a person. Accordingly, the sensitivity for dog/cat is set to S3, and the sensitivity for bird, which moves faster than dog/cat is set to the sensitivity S4. In a case where the subject type is vehicle, the movement is fast and the contrast is high in many cases, and the moving object determination can be performed using a stable focus detection result, and therefore, the highest sensitivity S5 is set.

In FIG. 7, the sensitivity is also changed depending on the SW1/SW2 press state and the single image-capturing/continuous image-capturing setting, other than the subject type. As to the sensitivity setting in the SW1/SW2 press state, a setting is made so that the moving object determination is performed more sensitively for the SW2. Recording of an image of a subject in focus is permitted at the timing of the SW2 being pressed. Therefore, it is easy to switch to the servo AF by sensitively performing the moving object determination when the subject in focus has moved. This makes it possible to record an image with less blur by performing focus tracking for the subject.

As to the sensitivity setting in the single image-capturing/continuous image-capturing setting, a setting is made so that the moving object determination is performed more sensitively for the continuous image-capturing. This is because image capturing is often performed in the continuous image-capturing setting for a subject that is a moving object, in order to record an image having a composition satisfactory for a user of the image pickup apparatus, i.e., conversely, it can be presumed that a subject that is a moving object is imaged in the continuous image-capturing setting in many cases. As described above, the sensitivity is changed depending on the SW1/SW2 press state and the single image-capturing/continuous image-capturing setting. However, in a case where the moving object determination is performed sensitively beyond the sensitivity S5, the moving object determination can be erroneous even if the image capturing conditions are satisfactory in the focus detection such as a case where the contrast is high, and therefore, in FIG. 7, the sensitivity is set not to be more sensitive than S5.

A method of making the moving object determination insensitive in a situation where the moving object determination is likely to be erroneous will be described. First, in a case where the subject distance when the subject is in focus by step S307 is shorter than a predetermined threshold, the sensitivity of the moving object determination in each of the cases illustrated in FIG. 7 is lowered by one level.

The predetermined threshold in the subject distance used here will be referred to as "moving object determination limit distance". The reason why the sensitivity of the moving object determination is lowered based on the moving object determination limit distance will be described. In a case where the distance to the subject is short, the subject greatly blurs even when the image pickup apparatus or the subject slightly swings back and forth, and the probability of switching to the servo AF by satisfying the condition for the moving object determination increases. If the focus is made to track a subject in response to the defocus amount corresponding to a swing of such a subject, the in-focus position can be unstable. To prevent this, the sensitivity of the moving object determination is lowered based on the moving object determination limit distance.

The moving object determination limit distance may be changed depending on the type of a recognized subject. In FIG. 8, as to the moving object determination limit distance, L0 is the longest distance, the moving object determination limit distance decreases in order of L1, L2, L3, and L4, and L5 is the shortest distance. In a case where a subject cannot be recognized, the moving object determination can be erroneous as described above, and therefore, L0, which is the longest moving object determination limit distance, is set. Otherwise, the moving object determination limit distance is set to be longer as the size of the subject is larger, depending on the type of a recognized subject. This is because, if the long moving object determination limit distance is set for a small subject, the sensitivity of the moving object determination can be raised only in a case where the subject is small in an angle of view, and an image at the in-focus position made to track the subject by the servo AF cannot be recorded. In a case where luminance in the entire angle of view or in the area of the recognized subject obtained by the AE unit 130 is lower than a predetermined value, the sensitivity of the moving object determination in each of the cases illustrated in FIG. 7 is lowered by one level. This is because the focus detection result can be unstable in a low luminance environment, so that the moving object determination can be erroneous. The image pickup apparatus has an automatic image capturing setting mode in which the image pickup apparatus may automatically make settings about image capturing such as a shutter speed, an aperture value, and an ISO sensitivity, and the sensitivity of the moving object determination is raised only in a case where the image pickup apparatus is in this automatic image capturing setting mode, whereas the sensitivity is fixed to S0 in other modes. In a case where this function of automatically switching between the one-shot AF and the servo AF is used in a mode other than the automatic image capturing setting mode, it can be presumed that image capturing at the stable in-focus position by the one-shot AF is also important, and therefore, the sensitivity of the moving object determination is not raised. On the contrary, in the automatic image capturing setting mode, switching between the one-shot AF and the servo AF is completely entrusted to the image pickup apparatus, and therefore, it can be presumed that the sensitivity of the moving object determination may be raised according to the subject recognition result.

As described above, according to the present embodiment, the moving object determination for the subject can be adaptively performed. It is possible to improve focus stability by making it easy to initiate the one-shot AF for a non-moving object, while improving focus trackability by making it easy to initiate the servo AF for a moving object.

In the above-described embodiment, whether the subject has moved is determined by comparing the difference between the defocus amount as the latest focus detection result and the defocus amount detected in the last period, with the threshold. This threshold is set depending on whether the subject has been successfully recognized or depending on the result of recognizing the type of the subject. However, the present disclosure is not limited to the example. For example, the moving direction and speed of the subject may be acquired using a motion vector detected from an image, and whether the subject has moved may be determined. There may be adopted a configuration in which a threshold for the motion vector is set depending on whether the subject has been successfully recognized or depending on the result of recognizing the type of the subject. Whether the subject has moved may be determined based on the size or position of the subject obtained from the subject recognition result. A configuration in which a threshold for a change in the size or position of the subject is set depending on the result of recognizing the type of the subject may be adopted. Whether the subject has moved may be comprehensively determined by comparing the defocus amount difference, the motion vector, and the change in the size or position of the subject, with the respective determination thresholds.

In the above-described embodiment, there is adopted the configuration in which, when the shutter button is half-pressed, whether the subject has stopped or moved is automatically determined, and switching between the one-shot AF and the servo AF is performed. A configuration in which, other than such an AF control automatic switching mode, a one-shot AF mode and a servo AF mode are selectable by a user may be adopted.

The present disclosure is described in detail based on preferable embodiments, but the present disclosure is not limited to those specific embodiments, and also includes various forms without departing from the scope of the present disclosure. Parts of the above-described embodiments may be appropriately combined.

The present disclosure also includes a case where a program of software that implements the functions of the above-described embodiments is supplied from a storage medium, directly or using wired/wireless communication, to a system or apparatus having a computer capable of executing a program.

Therefore, a program code itself supplied to or installed on a computer to implement the functional processing of the present disclosure in the computer also implements the present disclosure. In other words, the present disclosure also includes a computer program itself for implementing the functional processing of the present disclosure.

In this case, if the function of the program is provided, the program may be in any form such as an object code, a program executed by an interpreter, and script data supplied to an operating system (OS).

Examples of the storage medium for supplying the program may include a hard disk, a magnetic recording medium such as a magnetic tape, an optical/magnetooptical recording medium, and a nonvolatile semiconductor memory.

As a method of supplying the program, a method in which a computer program that forms the present disclosure is stored in a server on a network and a connected client computer downloads the computer program to perform programming is also conceivable.

The disclosure of the present embodiments includes the following configurations, methods, and program.

(Configuration 1)

An image pickup apparatus including:

a detection unit configured to detect a specific object from an image picked up by an image pickup unit;

a determination unit configured to determine whether a subject is a moving object; and a setting unit configured to set a sensitivity to be used when the determination unit determines that the subject is a moving object, wherein the setting unit sets the sensitivity, depending on whether the specific object is detected by the detection unit.

(Configuration 2)

An image pickup apparatus including:

a detection unit configured to detect a specific object from an image picked up by an image pickup unit;

a determination unit configured to determine whether a subject is a moving object; and a setting unit configured to set a sensitivity to be used when the determination unit determines that the subject is a moving object by the determination unit, wherein the setting unit sets the sensitivity, depending on a type of the specific object detected by the detection unit.

(Configuration 3)

The image pickup apparatus according to configuration 1 or 2, further including a focus detection unit configured to detect a focus state based on a signal output from the image pickup unit, wherein the determination unit determines whether the subject is a moving object based on the focus state.

(Configuration 4)

The image pickup apparatus according to any one of configurations 1 to 3 further including:

a focus detection unit configured to detect a focus state based on a signal output from the image pickup unit; and a focus adjustment unit configured to adjust the focus state by moving a focus lens based on the focus state.

(Configuration 5)

The image pickup apparatus according to configuration 4, wherein the focus adjustment unit has a first focus adjustment mode for fixing focus once the focus is achieved, and a second focus adjustment mode for keeping focusing to track a subject, and wherein the first focus adjustment mode and the second focus adjustment mode are each selected based on a result of determination by the determination unit.

(Configuration 6)

The image pickup apparatus according to any one of configurations 1 to 5, wherein the focus detection unit detects a defocus amount as the focus state.

(Configuration 7)

The image pickup apparatus according to any one of configurations 1 to 6, further including an instruction unit configured to issue an instruction to perform an image capturing preparation operation and an instruction to perform an image capturing operation, wherein the setting unit sets the sensitivity, based on issuance of the instruction to perform the image capturing preparation operation or issuance of the instruction to perform the image capturing operation by the instruction unit.

(Configuration 8)

The image pickup apparatus according to any one of configurations 1 to 7, wherein the setting unit sets the sensitivity based on whether an image capturing mode is single image-capturing or continuous image-capturing.

(Configuration 9)

The image pickup apparatus according to any one of configurations 1 to 8, wherein the setting unit sets the sensitivity higher in a case where the specific object is detected by the detection unit than in a case where the specific object is not detected.

(Configuration 10)

The image pickup apparatus according to any one of configurations 1 to 9, wherein the specific object detected by the detection unit is at least one of a flower, a person, an animal, and a vehicle.

(Configuration 11)

The image pickup apparatus according to any one of configurations 1 to 10, wherein the sensitivity is set lower in a case where a distance from the image pickup apparatus to a subject is less than a threshold, than in a case where the distance is more than or equal to the threshold.

(Configuration 12)

The image pickup apparatus according to configuration 11, wherein the threshold is set based on a type of the specific object detected by the detection unit.

(Configuration 13)

The image pickup apparatus according to any one of configurations 1 to 12, wherein the setting unit sets the sensitivity, depending on luminance of the entire image picked up by the image pickup unit or luminance of a subject area.

(Configuration 14)

The image pickup apparatus according to any one of configurations 1 to 13, wherein an autofocus (AF) control automatic switching mode, a one-shot AF mode, and a servo AF mode are selectable by a user.

(Configuration 15)

The image pickup apparatus according to any one of configurations 1 to 14, wherein the determination unit determines that the subject is a moving object, in a case where a number of times in a row that a difference between a latest defocus amount and a last defocus amount among defocus amounts of the subject obtained by the focus detection unit in time series is more than or equal to a threshold is more than or equal to a predetermined number of times.

(Configuration 16)

The image pickup apparatus according to configuration 15, wherein the threshold for the difference between the defocus amounts is reduced or the predetermined number of times is reduced in a case where the sensitivity is raised, and wherein the threshold for the difference between the defocus amounts is increased or the predetermined number of times is increased, in a case where the sensitivity is lowered.

(Method 1)

A control method for an image pickup apparatus, the control method comprising: detecting a specific object from an image picked up by an image pickup unit; determining whether a subject is a moving object; and setting a sensitivity to be used when it is determined that the subject is a moving object, wherein the sensitivity is set depending on whether the specific object is detected.

(Method 2)

A control method for an image pickup apparatus, the control method comprising: detecting a specific object from an image picked up by an image pickup unit;

determining whether a subject is a moving object; and setting a sensitivity to be used when it is determined that the subject is a moving object, wherein the sensitivity is set depending on a type of the detected specific object.

(Program 1)

A program for causing a computer to function as each of the units of the image pickup apparatus according to any one of configurations 1 to 16.

According to the embodiments of the present disclosure, whether a subject is a moving object can be adaptively determined. It is possible to switch between a first AF operation to fix focus once the focus is achieved and a second AF operation to keep focusing on a moving subject, by adaptively determining whether a subject is a moving object.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-203597, filed Dec. 20, 2022, which is hereby incorporated by reference herein in its entirety.

What is claimed is:

1. An image pickup apparatus comprising:
at least one memory configured to store instructions; and
at least one processor communicatively connected to the at least one memory and configured to execute the stored instructions to function as:
a detection unit configured to detect a specific object from an image picked up by an image pickup unit;
a determination unit configured to determine whether a subject is a moving object;
a setting unit configured to set a sensitivity to be used when the determination unit determines that the subject is a moving object; and
a focus detection unit configured to detect a focus state based on a signal output from the image pickup unit,
wherein the determination unit determines whether the subject is a moving object based on the focus state,
wherein the setting unit sets the sensitivity depending on whether the specific object is detected by the detection unit,
wherein the focus detection unit detects a defocus amount as the focus state,
wherein the determination unit determines that the subject is a moving object, in a case where a number of times in a row, that a difference between a latest defocus amount and a last defocus amount among defocus amounts of the subject obtained by the focus detection unit in time series is more than or equal to a threshold, is more than or equal to a predetermined number of times.

2. The image pickup apparatus according to claim 1,
wherein the threshold for the difference between the defocus amounts is reduced or the predetermined number of times is reduced in a case where the sensitivity is raised, and
wherein the threshold for the difference between the defocus amounts is increased or the predetermined number of times is increased in a case where the sensitivity is lowered.

3. The image pickup apparatus according to claim 1, further comprising:
a focus detection unit configured to detect a focus state based on a signal output from the image pickup unit; and
a focus adjustment unit configured to adjust the focus state by moving a focus lens based on the focus state.

4. The image pickup apparatus according to claim 3,
wherein the focus adjustment unit has a first focus adjustment mode for fixing focus once the focus is achieved and a second focus adjustment mode for keeping focusing to track a subject, and
wherein the first focus adjustment mode and the second focus adjustment mode are each selected based on a result of determination by the determination unit.

5. The image pickup apparatus according to claim 1, further comprising an instruction unit configured to issue an instruction to perform an image capturing preparation operation and an instruction to perform an image capturing operation,
wherein the setting unit sets the sensitivity based on the instruction issued by the instruction unit.

6. The image pickup apparatus according to claim 1, wherein the setting unit sets the sensitivity based on whether an image capturing mode is single image-capturing or continuous image-capturing.

7. The image pickup apparatus according to claim 1, wherein the setting unit sets the sensitivity higher in a case where the specific object is detected by the detection unit than in a case where the specific object is not detected.

8. The image pickup apparatus according to claim 1, wherein the specific object detected by the detection unit is at least one of a flower, a person, an animal, and a vehicle.

9. The image pickup apparatus according to claim 1, wherein the setting unit sets the sensitivity depending on luminance of the entire image picked up by the image pickup unit or luminance of a subject area.

10. The image pickup apparatus according to claim 1, wherein an autofocus (AF) control automatic switching mode, a one-shot AF mode, and a servo AF mode are selectable by a user.

11. An image pickup apparatus comprising:
at least one memory configured to store instructions; and
at least one processor communicatively connected to the at least one memory and configured to execute the stored instructions to function as:
a detection unit configured to detect a specific object from an image picked up by an image pickup unit;
a determination unit configured to determine whether a subject is a moving object;
and a setting unit configured to set a sensitivity to be used when the determination unit determines that the subject is a moving object,
wherein the setting unit sets the sensitivity depending on whether the specific object is detected by the detection unit,
wherein the sensitivity is set lower in a case where a distance from the image pickup apparatus to the subject is less than a threshold than in a case where the distance is more than or equal to the threshold.

12. The image pickup apparatus according to claim 11, wherein the threshold is set based on a type of the specific object detected by the detection unit.

13. A control method for an image pickup apparatus, the control method comprising:
detecting a specific object from an image picked up by an image pickup unit;
determining whether a subject is a moving object;
setting a sensitivity to be used when it is determined that the subject is a moving object;
detecting a focus state based on a signal output from the image pickup unit; and
determining whether the subject is a moving object based on the focus state,
wherein the sensitivity is set depending on whether the specific object is detected,
wherein a defocus amount is detected as the focus state,
wherein it is determined that the subject is a moving object, in a case where a number of times in a row, that a difference between a latest defocus amount and a last defocus amount among defocus amounts of the subject obtained in time series is more than or equal to a threshold, is more than or equal to a predetermined number of times.

14. The image pickup apparatus according to claim 11, further comprising:

a focus detection unit configured to detect a focus state based on a signal output from the image pickup unit; and a focus adjustment unit configured to adjust the focus state by moving a focus lens based on the focus state.

15. The image pickup apparatus according to claim 11, wherein the focus adjustment unit has a first focus adjustment mode for fixing focus once the focus is achieved and a second focus adjustment mode for keeping focusing to track a subject, and wherein the first focus adjustment mode and the second focus adjustment mode are each selected based on a result of determination by the determination unit.

16. The image pickup apparatus according to claim 11, further comprising an instruction unit configured to issue an instruction to perform an image capturing preparation operation and an instruction to perform an image capturing operation, wherein the setting unit sets the sensitivity based on the instruction issued by the instruction unit.

17. The image pickup apparatus according to claim 11, wherein the setting unit sets the sensitivity based on whether an image capturing mode is single image-capturing or continuous image-capturing.

18. The image pickup apparatus according to claim 11, wherein the setting unit sets the sensitivity higher in a case where the specific object is detected by the detection unit than in a case where the specific object is not detected.

19. The image pickup apparatus according to claim 11, wherein the specific object detected by the detection unit is at least one of a flower, a person, an animal, and a vehicle.

20. The image pickup apparatus according to claim 11, wherein the setting unit sets the sensitivity depending on luminance of the entire image picked up by the image pickup unit or luminance of a subject area.

21. The image pickup apparatus according to claim 11, wherein an autofocus (AF) control automatic switching mode, a one-shot AF mode, and a servo AF mode are selectable by a user.

22. A control method for an image pickup apparatus, the control method comprising:

detecting a specific object from an image picked up by an image pickup unit;

determining whether a subject is a moving object;

and setting a sensitivity to be used when it is determined that the subject is a moving object, wherein the sensitivity is set depending on whether the specific object is detected, wherein the sensitivity is set lower in a case where a distance from the image pickup apparatus to the subject is less than a threshold than in a case where the distance is more than or equal to the threshold.

* * * * *